Figure 1:
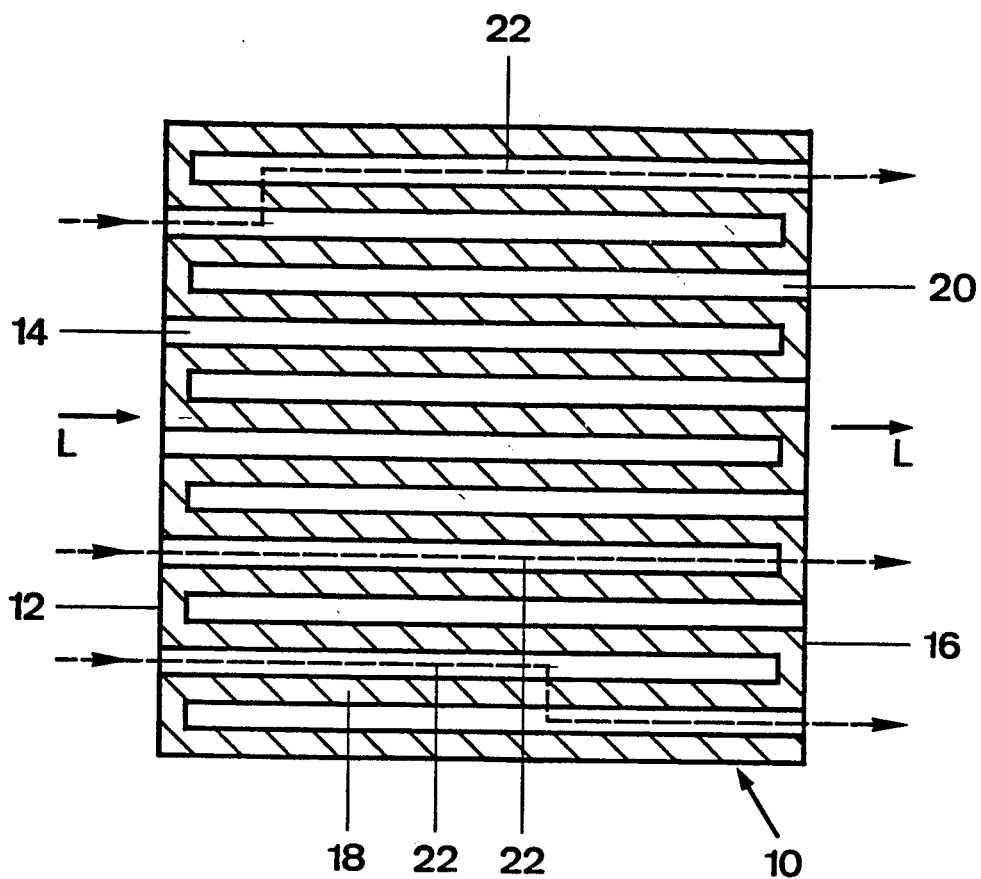

United States Patent [19]

Gabathuler et al.

[11] Patent Number: 5,063,007
[45] Date of Patent: Nov. 5, 1991

[54] PROCESS FOR MANUFACTURING A CERAMIC FOAM BODY

[75] Inventors: Jean-Pierre Gabathuler, Schleitheim; Karl-Ludwig Eckert; Peter Käser, both of Schaffhausen; Albert Maurer, Thayngen; Anton Fischer, Schaffhausen, all of Switzerland

[73] Assignee: Alusuisse-Lonza Services Ltd., Zurich, Switzerland

[21] Appl. No.: 555,101

[22] Filed: Jul. 18, 1990

[30] Foreign Application Priority Data

Aug. 8, 1989 [CH] Switzerland .......................... 2926/89

[51] Int. Cl.$^5$ .............................................. B29H 7/20
[52] U.S. Cl. .......................................... 264/44; 264/59
[58] Field of Search ...................... 264/44, 59; 55/521, 55/523

[56] References Cited

U.S. PATENT DOCUMENTS

| | | | |
|---|---|---|---|
| 2,506,244 | 5/1950 | Stopka | 264/59 |
| 4,364,760 | 12/1982 | Higuchi et al. | 55/523 |
| 4,396,565 | 8/1983 | Tomita et al. | 264/44 |
| 4,464,185 | 8/1984 | Tomita et al. | 55/310 |
| 4,652,286 | 3/1987 | Kusuda et al. | 55/523 |

FOREIGN PATENT DOCUMENTS

| | | |
|---|---|---|
| 0192158 | 8/1986 | European Pat. Off. . |
| 0265777 | 5/1988 | European Pat. Off. . |
| 58-94943 | 6/1983 | Japan . |

Primary Examiner—Jan H. Silbaugh
Assistant Examiner—Christopher A. Fiorilla
Attorney, Agent, or Firm—Bachman & LaPointe

[57] ABSTRACT

The process for manufacturing an open pore foam body with three dimensional ceramic network, in particular as a filter for the treatment of hot gases or as a catalyst substrate, has as its starting material a block of open pore plastic foam. This is impregnated at least once with a ceramic suspension, freed of excess ceramic suspension and heated to a temperature below the melting point of the plastic, then finally burnt off at a temperature at which the ceramic sinters together. At least one plastic foam layer is impregnated, assembled into a plastic foam block with flow channels between two layers and sintered to form a Z-flow filter.

6 Claims, 3 Drawing Sheets

PROCESS FOR MANUFACTURING A CERAMIC FOAM BODY

The invention relates to a process for manufacturing an open pore foam body with three-dimensional ceramic network structure, in particular as a filter for treatment of hot gases or as catalyst substrate, starting from a soft, open pore plastic foam block which is impregnated at least once with a ceramic suspension, freed of excess ceramic suspension, heated to a temperature below the melting point of the plastic and finally burned off at a temperature at which the ceramic sinters together.

It has been shown to be advantageous with known hot gas or catalytic treatments to produce ceramic filters in the form of cylindrical, stable blocks. Such blocks are provided with a large cross-sectional surface area by means of holes alternately in the front and rear with respect to the direction of flow of the gas; the said large internal surface area ensures adequate possibility for gas to flow through the ceramic filter.

The principle of hot gas filtration or catalytic treatment using an open pore ceramic foam is illustrated in FIG. 1 of the drawings herein represents the state-of-the-art device. The gas flowing through the ceramic foam body 10 in the direction indicated by the arrow L enters longitudinal flow channels 14 on the entry end 12; these channels 14 are closed towards the exit end 16 of the ceramic foam filter 10.

The pressure built up in the channels 14 causes the gas to flow through the open pore cell walls 18 of the ceramic foam body into the neighboring, likewise longitudinal channels 20 which are open at the exit end 16, but closed at or near to the entry end 12.

Dotted lines 22 indicate by way of example the routes taken by gas molecules through the ceramic foam body 10. In by far most cases the gas molecules flow from one channel 14 on the whole approximately vertically through a porous dividing wall 18 into a channel 20 where they flow out of the body. Depending on the type of foam body, solid constituents are removed from the gas or a catalytic reaction takes place as the gas passes through the porous dividing wall 18.

The type of foam body shown in FIG. 1 is called a Z-flow filter because, for the main part, the flow path taken by the gas through the open pore ceramic structure is essentially Z-shaped.

If the ratio of length to diameter of the channels 14, 20 exeeds a specific value, for example 3–5, then considerable problems arise with the ceramic foam body manufactured by the normal manufacturing processes. Normally during manufacture of the ceramic foam body, an organic foam is impregnated with a ceramic suspension and then subjected to a calcination process in which the foam is burnt off. Depending on the version of the ceramic foam required one must therefore first have a corresponding soft foam structure of organic material.

As the normal mechanical methods for producing deep holes of high accuracy and small cross-section in soft plastic foam can no longer be used, other methods of manufacture must be employed.

The Japanese patent publication No. 61-222968 and European Patent EP-A1 019 2158 describe in detail the production of organic foam bodies which are foamed in-situ in a mold. The disadvantages of this process are obvious: a complicated mold has to be manufactured, the process is labor intensive and therefore as a whole expensive.

The object of the present invention is to develop a process of the kind described at the start which makes it possible to use methods that allow deep channels of small cross-section to be made at favorable cost thus providing an optimal balance between pressure-loss and efficiency without considerable tool costs.

The object is achieved by way of the invention in that at least one plastic foam layer is impregnated, assembled to a plastic foam block in the form of a Z-flow filter with flow channels between two layers, then sintered.

According to a first preferred version a plastic foam strip is impregnated, coiled into a spiral-shaped foam block to form a Z-flow filter with flow channels between the windings of the coiled strip.

The prescribed dimensions of the plastic foam strip, which is preferably of polyurethane, polyester or polyether, are achieved by cutting or foaming in simple molds. The outer dimensions of the coiled, preferably cylindrical plastic foam body lie in practice between 50 and 500 mm in diameter, preferably between 90 and 320 mm, in diameter and 100–400 mm, in height preferably 150–340 mm. The porosity is usefully in the range 10–100 ppi, in particular 50–80 ppi wherein ppi are pores per inch.

To form the flow channels a prescribed distance apart from each other, thin-walled tubes of a combustible plastic, alternatingly flush at one end with one of the narrow longitudinal sides, can be clamped into the spiral coils of the plastic foam strip.

Tubes that are open at both ends, or tubes that are closed at one end can be inserted, in the latter case however with the opening flush with one of the narrow long sides.

During the sintering of the impregnated plastic foam block the inserted tubes are burnt off with the supporting plastic network.

Further precise grooves can be made on one strip surface, and such that they are alternately open at one narrow longitudinal side of the strip and closed at the other longitudinal side. On rolling up the plastic foam strip the preferably mechanically or thermally prepared grooves form the flow channels together with the adjacent winding of the coil.

The mechanical preparation takes place usefully in a generally known manner via drilling, milling, sawing or cutting.

According to a second preferred version of the invention plastic foam slices, preferably of polyurethane, polyester or polyether, are assembled to form a plastic foam block. A first series of slices features holes and/or slits. A second series of slices features alternatingly a fraction of the holes and/or slits of the first series, a third series of slices features the remaining fraction of holes and/or slits. At least one slice of the first series is assembled at one end with one slice of the second series and, at the other end, with a slice of the third series, and such that blind holes are created running from one end of the foam body to the region of the other end. The impregnation preferably takes place before assembling the plastic foam slices.

The plastic foam slices to be assembled feature holes and/or slits preferably made by mechanical or thermal mean .

On fitting the plastic foam slices together the flow channels formed preferably run parallel to each other and extend alternately from one end of the plastic foam block to the region of the other end. The depth of the channels is preferably at least five times the smallest cross-sectional dimension or diameter of a hole. The end of the channels is usefully a distance from the neighboring longitudinal side that corresponds to the mutual spacing of the channels. This prevents a significant amount of the gas leaving the ceramic foam body directly through its outlet end.

The parallel channels can have any desired geometrical shape of cross-section. The walls of the channels can run straight, tapering or widening. The variety of shapes is limited solely by the technical limits of creating the shape. In the simplest case a flow channel has a round, semi-circular or rectangular, cross-section in particular a square or almost square cross-section produced by means of an inserted tube or machine by means of a drill or milling machine. The linear cross-section dimensions of a channel are preferably 5–50 mm, in particular 6–15 mm.

The mutual space between parallel flow channels is preferably in the range 5–50 mm, in particular 6–15 mm. The distance of a channel end from the neighboring end wall is preferably 10–50 mm, in particular 20–30 mm. In other words a channel is 10–50 mm, preferably 20–30 mm, shorter than the total height of the corresponding plastic foam block. Both the mutual distance between the channels and the distance of the channel end from the neighboring end wall of the plastic foam block are about the same size in practice.

According to a special method of producing grooves in a plastic foam strip or holes and/or slits in plastic foam slices, these are cooled and hence made rigid using liquid nitrogen or liquid air, the embrittled plastic foam machined and then reheated to ambient temperature. Further, the pores in the plastic foam can be filled with a medium that is liquid at room temperature e.g. water, the medium frozen and the plastic foam machined along with the solidified medium; the medium is then melted by reheating and removed from the pores in the plastic foam.

Plastic blocks made up of a layered structure are particularly suitable for manufacturing diesel-engine soot-removing filters for commercial vehicles as large dimensions are the rule there.

Figure 2:
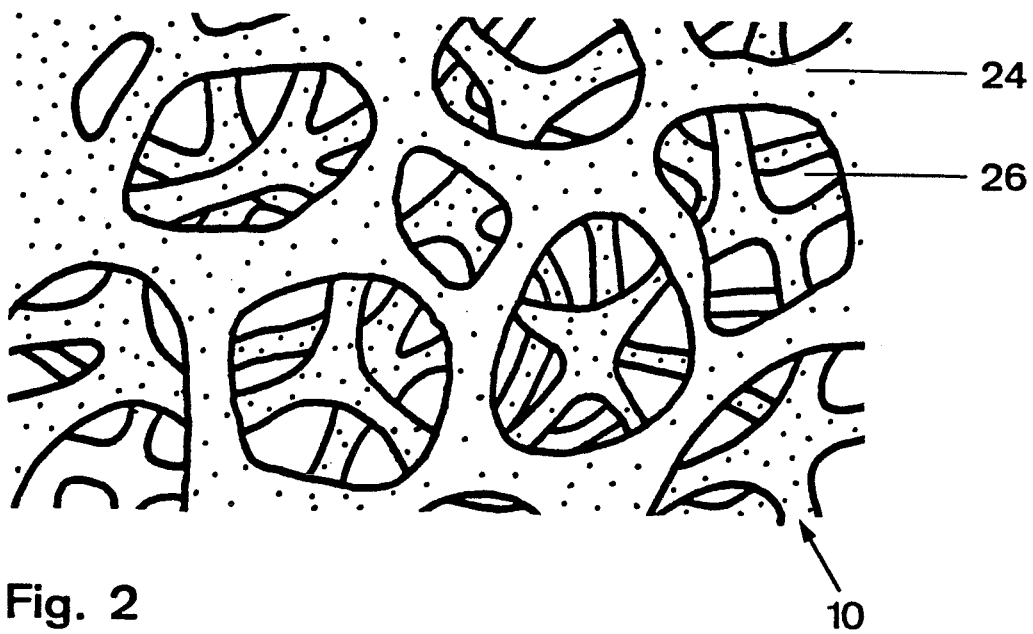

The invention is, apart from the state of the art method in FIG. 1, explained in the following in greater detail with the aid of examples shown in the figures, These show schematically:

FIG. 2 A greatly magnified view of part of a ceramic foam.

Figure 3:
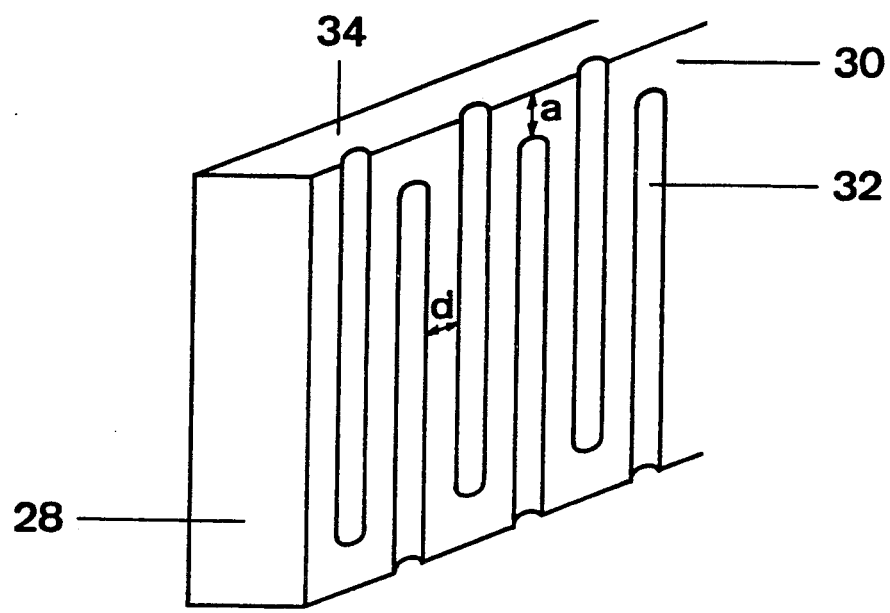

FIG. 3 A plastic foam strip with grooves made in it.

Figure 4:
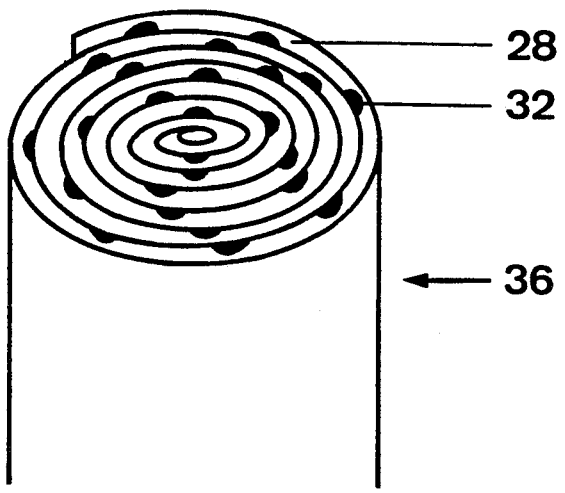

FIG. 4 A plastic foam block made out of a strip as shown in FIG. 3.

Figure 5:
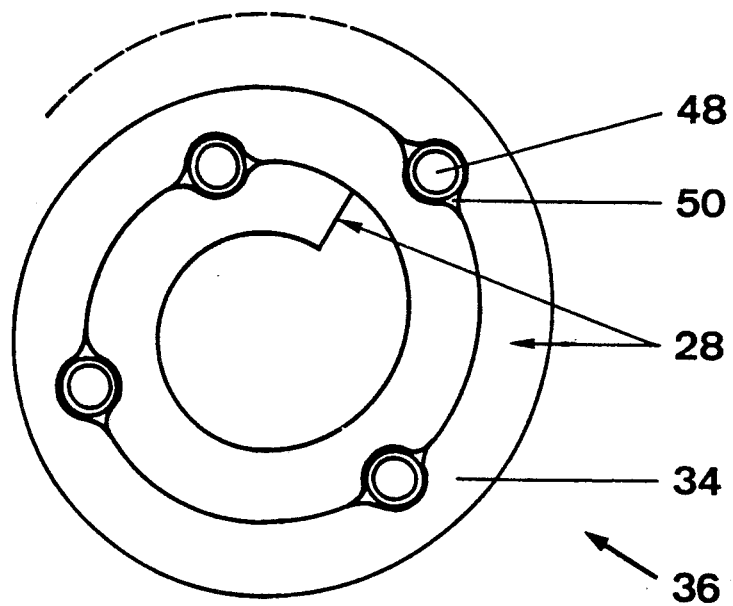

FIG. 5 A block of coiled plastic foam strip with inserted combustible plastic tubes.

Figure 6:
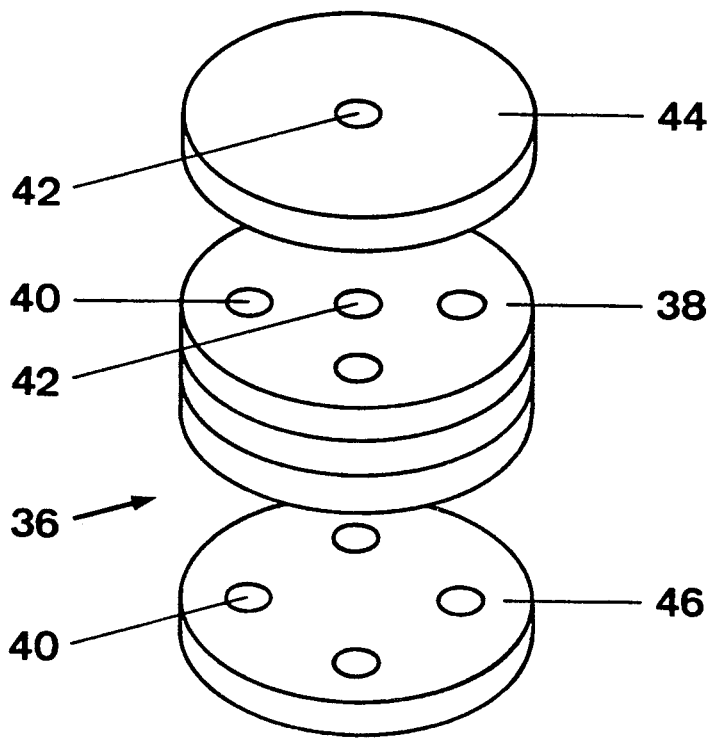

FIG. 6 An exploded view of a plastic foam block made up of plastic foam slices.

The greatly magnified foam body of ceramic in FIG. 2 shows the three dimensional network type of structure with ceramic ribs 24 forming open pores 26. The number of pores per unit length is chosen such that an optimal balance between pressure drop and efficiency is obtained for the application in question. When a contaminated gas flows through, the solid particles e.g. diesel engine soot remain stuck to the ceramic ribbing.

The structure of the ceramic foam body shown in FIG. 2 has a very large active surface area, which also makes the ceramic ribbing 24 an optimal catalyst support.

The plastic foam strip 28 shown in FIG. 3 is about 40 mm thick. Grooves 32 which are semi-circular in cross-section have been made in one surface 30 of the strip 28. These grooves 32 are a distance a shorter in length than the width of the plastic foam strip 28, and are alternatingly open at one or the other narrow sides 34 of the strip. Both the diameter of the grooves 32 and their mutual distance d apart amounts to about 10 mm.

FIG. 4 shows a plastic foam strip 28 that has been spirally wound into a large-format plastic foam block 36 such that the grooves 32 lie on the inside of the plastic foam strip 28. Together with the outer face of the adjacent inner winding the grooves 32 form, with respect to the plastic foam block, longitudinal channels. Only every second longitudinal groove 32 is visible, the others are closed at the end in view.

From the functional standpoint the foam body 10 of ceramic made out of a plastic foam block 36 represents a homogeneous, foamed plastic with holes machined in it.

FIG. 5 shows the innermost part of a large format plastic foam block 36 made out of coiled plastic foam strip 28. For simplicity only few windings are shown, the continuation is indicated by broken lines.

Thin-walled plastic tubes 48 have been clamped between the windings of the coiled plastic foam strip 28. The strip 28 does not feature any grooves 32 (FIG. 3); on coiling, the plastic tubes 48 press against the plastic foam strip thus creating corresponding bulges in it.

The plastic tubes 48 which are open at both ends are alternatingly flush with the upper and lower narrow sides 34 of the plastic foam strip 28. For that reason only half of the total number of inserted plastic tubes 48 is visible in FIG. 5.

On sintering, the plastic tubes 48 are burnt off along with the organic network of the plastic foam. As a result flow channels 14,20 corresponding in principle to those shown in FIG. 1 are formed, in the present case constituting the spaces 50 produced by the clamped-in plastic tubes 48. The open pore structure of the resultant ceramic foam body permits transfer of gases to and from the flow channels with little resistance.

FIG. 6 shows plastic foam in the form of round slices in the process of being fitted together to make a large-format plastic foam block 36. For simplicity only few holes running through the plastic slices are shown here in order that the principle can be better understood. In reality the slices making up a large-format plastic foam block feature several dozen holes.

Several plastic foam slices 38 with a central hole 42 and four peripheral holes 40 are placed one on top of the other in such a way that the holes form a continuous, through-thickness channel. At one end a plastic foam slice 44 features only one central hole 42 while at the other end a plastic foam slice 46 is provided with four peripheral holes 40. The holes in both end slices 44, 46 are in-line with the corresponding holes in the plastic foam slices 38 when all are fitted together.

When the plastic foam slices 38, 44, 46 are all fitted together a central hole 42 is open at the top and closed at the bottom; four peripheral holes 40 on the other hand are open at the bottom and closed at the top. This way a large format ceramic foam body can be manufactured with channels that are very narrow in relation to their length.

Exemplified embodiments

1. A diesel engine soot-removing filter for a private car, a foam filter of ceramic, has a porosity of 70 ppi. The outer diameter is 160 mm, the height 170 mm. The plastic foam block to be sintered is made out of a coiled plastic foam strip. Inserted at each side are 18 plastic tubes of polyethylene such that the outer end of each is flush with that narrow side of the coiled strip; the polyethylene tubes have an inner diameter of 8 mm and a wall thickness of 0.5 mm. The length of the plastic tubes is 145 mm, the space between them 10 mm.

2. A diesel engine soot-removing filter for a commercial vehicle, a ceramic foam filter, likewise has a porosity of 70 ppi. It has a diameter of 295 mm and a height of 330 mm. The plastic foam block to be sintered is made up of a coiled plastic foam strips without channels. Inserted at each side and flush with the corresponding narrow longitudinal side of the strip are 41 polyethylene plastic tubes of 0.5 mm wall thickness and 8 mm inner diameter. The plastic tubes are 305 mm in length; the end not flush with the side of the strip is therefore 25 mm from the neighboring end of the block. The distance between the tubes is 10 mm.

What is claimed is:

1. Process for manufacturing a Z-flow filter comprising an open pore foam body with a three-dimensional ceramic structure, which comprises:
   (a) providing a soft open pore plastic foam strip;
   (b) impregnating said foam strip at least once with a ceramic suspension;
   (c) freeing said foam strip of excess ceramic suspension;
   (d) assembling a spiral-shaped plastic foam block with a layered structure having flow channels from said impregnated foam strip by coiling said impregnated plastic foam strip to form layers and forming said flow channels by clamping thin-walled tubes of a combustible plastic in the layers alternatingly, the plastic foam strip having narrow longitudinal sides and each of said tubes having one end flush with one of said narrow longitudinal sides, the length of said tubes being about the depths of said flow channels;
   (e) heating said spiral-shaped plastic foam block to a temperature below the melting point of the plastic; and
   (f) burning off the plastic foam and plastic tubes at a temperature at which the ceramic sinters together to form a Z-flow filter with longitudinal channels therein which serve as flow channels.

2. Processing according to claim 1 wherein said filter is for treatment of hot gases.

3. Process according to claim 1 wherein said filter is a catalyst support.

4. Process according to claim 1 wherein said tubes are closed at one end with an open end flush with one of the narrow longitudinal sides.

5. Process according to claim 1 wherein the flow channels have cross-sectional dimensions of 5-50 mm and are at least five times as deep as the smallest cross-sectional dimension and are spaced uniformly a distance apart that is in the range of 5-50 mm.

6. Process according to claim 5 wherein the cross-sectional dimensions are 6-15 mm and the distance is 6-15 mm.

* * * * *